UNITED STATES PATENT OFFICE.

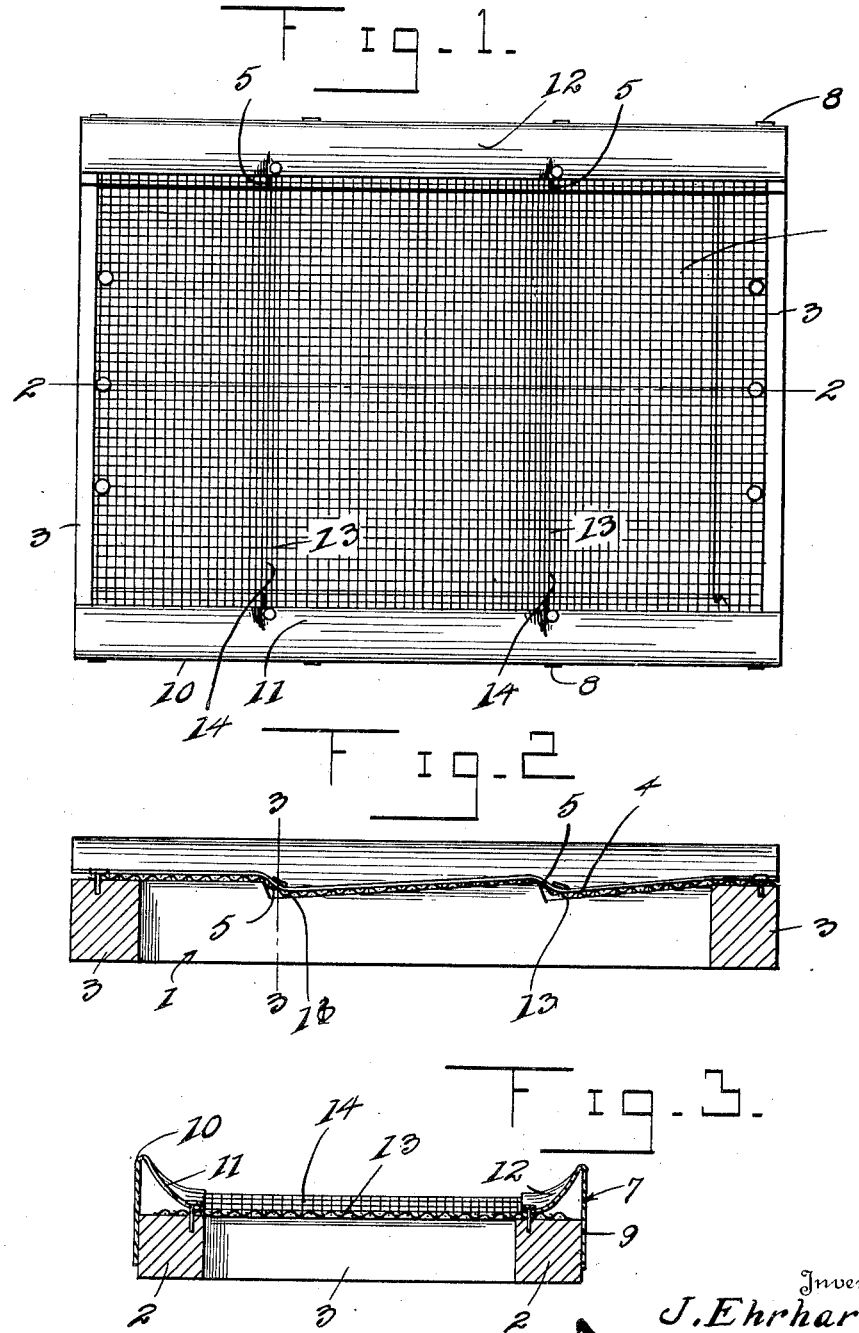

JACOB EHRHARDT, OF RAMONA, KANSAS.

WEED-SCREEN.

1,089,190.  Specification of Letters Patent.  Patented Mar. 3, 1914.

Application filed October 29, 1913.  Serial No. 797,974.

*To all whom it may concern:*

Be it known that I, JACOB EHRHARDT, a citizen of the United States, residing at Ramona, in the county of Marion and State of Kansas, have invented certain new and useful Improvements in Weed-Screens; and I do hereby declare the following to be a full, clear, and exact description of the invention, such as will enable others skilled in the art to which it appertains to make and use the same.

This invention relates to new and useful improvements in weed screens and has for its object the provision of a device of the above character which is adapted to be used in a threshing machine to separate the grain from the seed of weeds.

Another object of my invention is the provision of a novel means for supporting the screening wire and making the same maintain its corrugated condition.

A further object of my invention is the provision of means to coöperate with the frame in holding the screen in its normal position and preventing the same from becoming loosened therefrom.

With the above and other objects in view I will now proceed to describe my invention in the following specification and accompanying drawings, in which, Figure 1 is a top plan view of my improved weed separating machine, Fig. 2 is a longitudinal sectional view taken on line 2—2 of Fig. 1, and Fig. 3 is a transverse sectional view taken on line 3—3 of Fig. 2.

Referring to the drawings by characters of reference 1 indicates an ordinary rectangular frame which is preferably of wood, but may be constructed of any suitable material. This frame 1 is preferably composed of the two side pieces 2 and the end pieces 3, which are connected at their extremities in any suitable manner. Each of the side pieces 2 is provided along its upper side with the depressions 4, which are so formed as to provide the shoulders 5, which are adapted to aline with each other when the device is assembled.

Suitable guide members, indicated by the numeral 7, are secured to the side pieces 2 by means of the nails or screws 8, which extend through apertures in the guide members as will be clearly seen upon referring to the drawings. These guide members referred to by the numeral 7 preferably comprise the upstanding wall 9, which is bent back upon itself at its upper extremity as shown at 10, and again bent downwardly and outwardly to form the curved portion 11. At suitable points where the depressions forming the shoulders occur in each of the side pieces I preferably provide the ridges 12 which are formed in the curved portions and are adapted to materially assist in holding the screening in position.

The screening which is used is preferably of the ordinary type of sifting screen and is indicated by the numeral 13. At suitable intervals I preferably provide the ribs 14 over which the grain jumps when the device is in use.

It will be clearly seen from the foregoing that in use my improved screen is secured in the threshing machine in the usual manner and as the grain approaches the ribs it will be also apparent that the heavier grain, such as wheat and the like will jump over the ribs whereas the smaller and lighter grain and the seed of undesirable weeds will fall through the screen, thereby eliminating the undesirable seed and producing a substantially unadulterated product. Owing to the peculiar construction of the side walls of the screen it will be apparent that the tendency of the screening material to straighten will be materially reduced, and the said screening material will remain operative at all times.

While in the foregoing I have shown and described the preferred embodiment of my invention I wish it to be understood that I may change the specific combination and arrangement of parts without in any way departing from the spirit and scope of my invention as defined in the appended claim.

What is claimed is:—

In a device of the character described a rectangular frame, having depressions and upwardly extending shoulders formed on its lateral members, screening secured to the frame, said screening being adapted to enter the depressions and conform to the contour of the depressions and shoulders, and inwardly curved guides secured to the side pieces of the frame and adapted to conform to the shape of the side pieces and materially assist in maintaining the screen in its normal corrugated position.

In testimony whereof I affix my signature in presence of two witnesses.

JACOB EHRHARDT.

Witnesses:
S. C. ESKELDSON,
W. S. SMITH.

Copies of this patent may be obtained for five cents each, by addressing the "Commissioner of Patents, Washington, D. C."